US012786742B2

(12) United States Patent
Yang et al.

(10) Patent No.: US 12,786,742 B2
(45) Date of Patent: Nov. 3, 2026

(54) ANTENNA SELECTION METHOD AND APPARATUS, AND BASEBAND PROCESSING UNIT, BASE STATION AND STORAGE MEDIUM

(71) Applicant: ZTE CORPORATION, Shenzhen (CN)

(72) Inventors: Junli Yang, Shenzhen (CN); Hongshuai Han, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 290 days.

(21) Appl. No.: 18/695,103

(22) PCT Filed: Sep. 13, 2022

(86) PCT No.: PCT/CN2022/118513
§ 371 (c)(1),
(2) Date: Mar. 25, 2024

(87) PCT Pub. No.: WO2023/045805
PCT Pub. Date: Mar. 30, 2023

(65) Prior Publication Data

US 2024/0414559 A1 Dec. 12, 2024

(30) Foreign Application Priority Data

Sep. 26, 2021 (CN) .......................... 202111126970.2

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0602* (2013.01); *H04W 64/006* (2013.01); *H04W 84/06* (2013.01)

(58) Field of Classification Search
None
See application file for complete search history.

(56) References Cited

U.S. PATENT DOCUMENTS

2016/0205560 A1* 7/2016 Hyslop ................. H04W 16/14 455/454
2017/0019800 A1* 1/2017 Liu ................... H04W 72/0446
(Continued)

FOREIGN PATENT DOCUMENTS

CA 2780196 A1 * 5/2011 ............. H01Q 1/246
CN 107786253 A 3/2018
(Continued)

OTHER PUBLICATIONS

European Patent Office. Extended European Search Report for EP Application No. 22871853.2, mailed Jul. 18, 2025, pp. 1-9.
(Continued)

*Primary Examiner* — Kodzovi Acolatse
(74) *Attorney, Agent, or Firm* — Vivacqua Crane, PLLC

(57) ABSTRACT

Provided are an antenna selection method and apparatus, and a baseband processing unit, a base station and a storage medium. The antenna selection method is applied to a base band unit (BBU) and includes: acquiring first position information of the antenna module and second position information of an airborne terminal device; generating an offset angle value of the airborne terminal device according to the first position information and the second position information; and determining, according to the offset angle value and a preset threshold, a target antenna for performing wireless communication with the airborne terminal device, from the target antenna is the first antenna or the second antenna.

11 Claims, 4 Drawing Sheets

(51) Int. Cl.
*H04W 64/00* (2009.01)
*H04W 84/06* (2009.01)

(56) References Cited

U.S. PATENT DOCUMENTS

| | | | | |
|---|---|---|---|---|
| 2018/0019789 | A1* | 1/2018 | Hyslop | H04B 7/0617 |
| 2018/0145740 | A1* | 5/2018 | Tani | H04L 1/0003 |
| 2019/0068260 | A1 | 2/2019 | Yan et al. | |
| 2020/0243954 | A1 | 7/2020 | Diamond et al. | |
| 2021/0234270 | A1 | 7/2021 | Stoleru et al. | |
| 2021/0258067 | A1 | 8/2021 | Hoshino et al. | |
| 2022/0085491 | A1* | 3/2022 | Stoleru | H01Q 1/28 |
| 2023/0155661 | A1* | 5/2023 | Landström | H04B 7/0408 375/262 |

FOREIGN PATENT DOCUMENTS

| | | | | |
|---|---|---|---|---|
| CN | 107852225 | A * | 3/2018 | H04W 16/28 |
| CN | 111698639 | A | 9/2020 | |
| CN | 112153661 | A * | 12/2020 | H04W 36/0085 |
| CN | 112490636 | A | 3/2021 | |
| CN | 113055062 | A | 6/2021 | |
| CN | 121532968 | A * | 2/2026 | H04L 1/0026 |
| EP | 2434577 | A1 * | 3/2012 | H01Q 21/22 |
| WO | 2020045006 | A1 | 3/2020 | |

OTHER PUBLICATIONS

International Searching Authority. International Search Report and Written Opinion for PCT Application No. PCT/CN2022/118513 and English translation, mailed Nov. 17, 2022, pp. 1-10.

* cited by examiner

ANTENNA SELECTION METHOD AND APPARATUS, AND BASEBAND PROCESSING UNIT, BASE STATION AND STORAGE MEDIUM

CROSS-REFERENCE TO RELATED APPLICATION

This application is a national stage filing under 35 U.S.C. § 371 of international application number No. PCT/CN2022/118513, filed Sep. 13, 2022, which claims priority to Chinese patent application No. 202111126970.2, filed Sep. 26, 2021. The contents of these applications are incorporated herein by reference in their entirety.

TECHNICAL FIELD

Embodiments of the present disclosure relate to, but not limited to, the field of communication, and in particular, to an antenna selection method and apparatus, a base band unit (BBU), a base station, and a non-transitory computer-readable storage medium.

BACKGROUND

At present, there are mainly two technical schemes for aeronautical communication: a satellite communication scheme and an Air-To-Ground (ATG) broadband communication scheme. The satellite communication scheme has a wide coverage and can cover land and sea areas, but involves high deployment costs and operation costs and a high network delay. The ATG communication system scheme can be deployed only in land areas, but has the advantages of low costs, fast speed, low delay, and fast iterative upgrade of technology.

An ATG communication system needs to rely on a ground base station system to cover an existing high-altitude flight path and provide wireless access data bandwidth for an aircraft in flight, to realize real-time return of front cabin data of the aircraft and real-time monitoring of the state of the aircraft, provide a high-altitude network access service with large bandwidth, high reliability, and low delay for passengers and crew on the aircraft, and so on. However, existing ATG communication systems have a coverage hole. When the aircraft is in the coverage hole, the quality of wireless communication is unsatisfactory, failing to meet the needs of users.

SUMMARY

The following is a summary of the subject matter set forth in this description. This summary is not intended to limit the scope of protection of the claims.

A main objective of embodiments of the present disclosure is to provide an antenna selection method and apparatus, a BBU, a base station, and a storage medium, to provide a high-quality wireless communication service for users, thereby meeting the users' needs.

In accordance with a first aspect of the present disclosure, an embodiment provides an antenna selection method, which is applied to a BBU. The BBU is connected to an antenna module. The antenna module is configured for providing wireless communication coverage for a flight path. The antenna module includes a first antenna and a second antenna. A first coverage range of the first antenna is different from a second coverage range of the second antenna. The method includes: acquiring first position information of the antenna module and second position information of an airborne terminal device; generating an offset angle value of the airborne terminal device according to the first position information and the second position information; and determining, according to the offset angle value and a preset threshold, a target antenna for performing wireless communication with the airborne terminal device, where the target antenna is the first antenna or the second antenna.

In accordance with a second aspect of the present disclosure, an embodiment provides an antenna selection apparatus, including: an acquisition module, configured for acquiring first position information of an antenna module and second position information of an airborne terminal device; a generation module, configured for generating an offset angle value of the airborne terminal device according to the first position information and the second position information; and a determining module, configured for determining, according to the offset angle value and a preset threshold, a target antenna for performing wireless communication with the airborne terminal device, where the target antenna is the first antenna or the second antenna.

In accordance with a third aspect of the present disclosure, an embodiment provides a BBU, including: a memory, a processor, and a computer program stored in the memory and executable by the processor, where the computer program, when executed by the processor, causes the processor to implement the antenna selection method in accordance with the first aspect.

In accordance with a fourth aspect of the present disclosure, an embodiment provides a base station, including the BBU in accordance with the third aspect.

In accordance with a fifth aspect of the present disclosure, an embodiment provides a non-transitory computer-readable storage medium storing a computer-executable instruction which, when executed by a processor, causes the processor to implement the antenna selection method in accordance with the first aspect.

Additional features and advantages of the present disclosure will be set forth in the description which follows, and in part will be obvious from the description, or may be learned by the practice of the present disclosure. The objects and other advantages of the present disclosure can be realized and obtained by the structures particularly pointed out in the description, claims and drawings.

DETAILED DESCRIPTION

Figure 1:
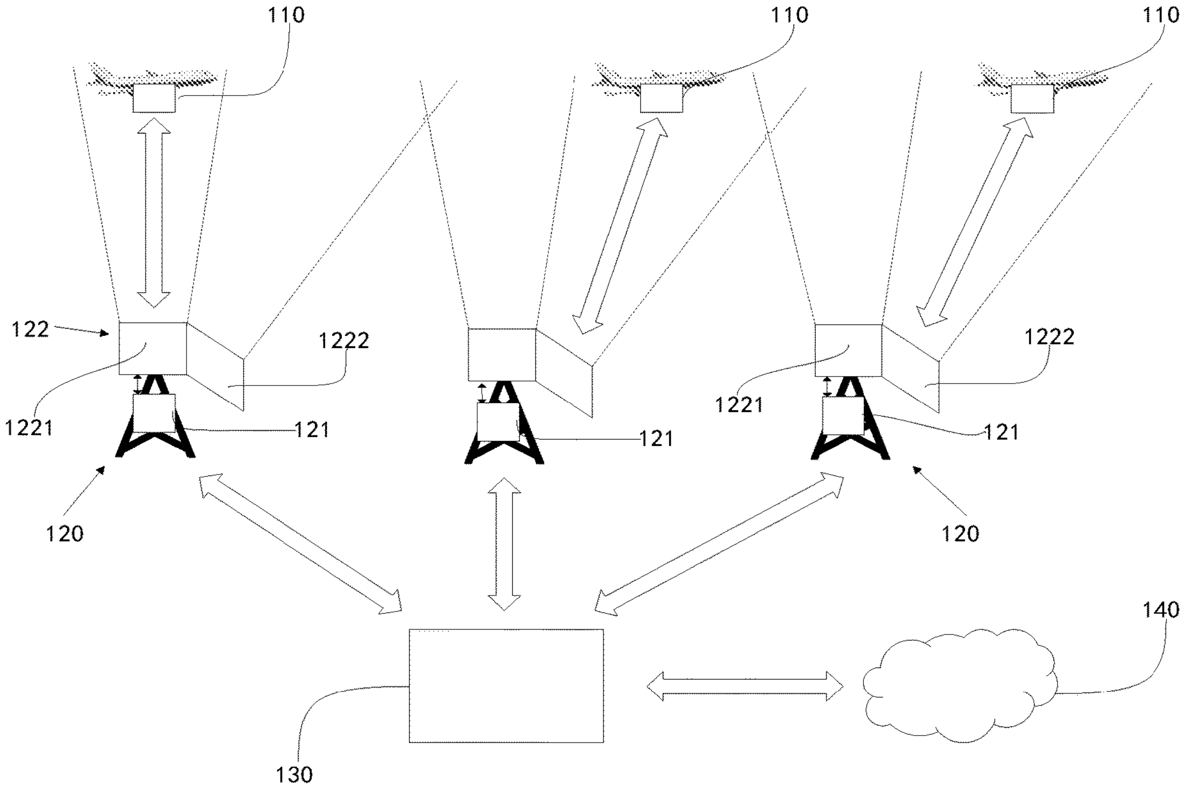
FIG. 1 is a schematic diagram of a system architecture platform configured for executing an antenna selection method according to an embodiment of the present disclosure.

To make the objects, technical schemes, and advantages of the present disclosure clear, the present disclosure is described in further detail in conjunction with accompanying drawings and examples. It should be understood that the specific embodiments described herein are merely used for illustrating the present disclosure, and are not intended to limit the present disclosure.

It is to be noted, although functional modules have been divided in the schematic diagrams of apparatuses and logical orders have been shown in the flowcharts, in some cases, the modules may be divided in a different manner, or the steps shown or described may be executed in an order different from the orders as shown in the flowcharts. The terms such as “first”, “second” and the like in the description, the claims, and the accompanying drawings are used to distinguish similar objects, and are not necessarily used to describe a specific sequence or a precedence order. First, several terms involved in the present disclosure are illustrated.

The ATG communication scheme adopts a wireless access technology and customized wireless transceiver devices. A telecommunications operator deploys ground base stations along a flight path or specific airspace for high-altitude coverage (where a single base station covers a height of 6000 to 12000 meters and a radius of 100 kilometers), to provide wireless data bandwidth of up to 100 Mbps for aircrafts on different flight paths at different altitudes, allowing passengers on the aircrafts to access the external Internet.

A base station includes a Building Base band Unit (BBU) and an Active Antenna Unit (AAU) connected to the BBU. The BBU is mainly configured to process a baseband digital signal and control the AAU. The AAU is a combination of a Remote Radio Unit (RRU) and an antenna, and integrates a plurality of Transmit/Receive (T/R) units. Main functions of the AAU include radio frequency modulation, radio frequency transmission, radio frequency reception, radio frequency demodulation, radio frequency control, etc.

RSRP: It is one of the key parameters and physical layer measurement requirements that can represent wireless signal strength in LTE networks. It is an average value of signal powers received on all resource elements (REs) carrying a reference signal within a certain symbol.

Core network (5GC): It is the core of a mobile network. It establishes a reliable and secure network connection for end users to access its services. The core domain is responsible for various basic functions in the mobile network, such as connectivity and mobility management, authentication and authorization, user data management, and policy management.

The Internet, also known as the World Wide Web, is a huge network of interconnected networks. These networks are connected to one another using a set of general protocols to form a logically single huge international network. In this network, there are network devices such as switches and routers, various connection links, various servers, and countless computers and terminal devices.

Embodiments of the present disclosure provide an antenna selection method and apparatus, a BBU, a base station, and a storage medium. The antenna selection method includes, but not limited to, the following steps: acquiring, by a BBU, first position information of an active antenna module and second position information of an airborne terminal device; generating an offset angle value of the airborne terminal device according to the first position information and the second position information; and determining, according to the offset angle value and a preset threshold, a target antenna for performing wireless communication with the airborne terminal device, where the target antenna is a first antenna or a second antenna. The target antenna is determined according to the offset angle value of the airborne terminal device relative to the active antenna module, to continuously provide a high-quality wireless communication service for users, thereby meeting the needs of users on an aircraft.

The technical schemes of the embodiments of the present disclosure will be described below with reference to the accompanying drawings.

FIG. 1 is a function block diagram of a system architecture platform to which embodiments of the present disclosure are applicable. In an embodiment, the system architecture platform includes an airborne terminal device 110, a plurality of base stations 120 configured for communicating with the airborne terminal device 110, a core network 130 connected to the base stations 120, and an Internet 140 connected to the core network 130. The positions of the plurality of base stations 120 are arranged according to a flight path. Each of the base stations 120 includes a BBU 121 and an antenna module 122 connected to the BBU 121. The antenna module 122 is configured for providing wireless communication coverage for the flight path. The antenna module 122 includes a first antenna 1221 and a second antenna 1222. A first coverage area of the first antenna 1221 is different from a second coverage area of the second antenna 1222. The BBU 121 is configured for controlling the antenna module 122. In addition, the airborne terminal device 110 is arranged on an aircraft, and is configured for providing a service processing capability for the aircraft and users on the aircraft in real time and transmitting information back to the base stations 120.

It can be understood that because the base stations 120 are arranged according to the flight path, each base station 120 is mainly responsible for providing coverage for an area above the base station 120 and an air area between two base stations 120 in the same direction, thereby achieving full signal coverage of the flight path.

It can be understood that an antenna panel corresponding to the first antenna 1221 and an antenna panel corresponding to the second antenna 1222 are arranged in different planes, indicating that the antenna panel corresponding to the first antenna 1221 and the antenna panel corresponding to the second antenna 1222 are arranged at a certain angle according to actual situations, so as to expand the total coverage range of the first antenna 1221 and the second antenna 1222.

It should be noted that the antenna module 122 may be an active antenna unit, or may include a passive antenna unit and an RRU, which is not particularly limited in the embodiments of the present disclosure.

It should be noted that the first coverage range may at least partially overlap with the second coverage range or may not overlap with the second coverage range, which is not particularly limited in the embodiments of the present disclosure.

It should be noted that the number of antennas arranged in the antenna module 122 is not limited in the embodiments of the present disclosure. For example, the antenna module 122 may include two antennas, which are arranged at different angles, or may include three antennas, where each of the three antennas may be arranged at a different angle, or two of the three antennas may be arranged at an angle, with the other antenna being arranged at another angle.

It should be noted that when the antenna module 122 includes one AAU, the first antenna 1221 includes a first antenna array and the second antenna 1222 includes a second antenna array, where an angle between the first antenna array and the second antenna array can be adjusted; or when the antenna module 122 includes two AAUs, the first antenna 1221 is one of the AAUs and the second antenna 1222 is the other AAU. An angle between the two AAUs may be set according to actual situations, which is not particularly limited in the embodiments of the present disclosure. It can be understood that the first antenna array includes a plurality of antenna array elements, the second antenna array also includes a plurality of antenna array elements, and the number of antenna array elements is not particularly limited in the embodiments of the present disclosure.

It should be noted that the aircraft on which the airborne terminal device 110 is arranged may be a plane or a helicopter, which is not particularly limited in the embodiments of the present disclosure.

For example, in a scenario where the antenna module 122 includes one AAU, to overcome the coverage hole problem of 5G ATG communication systems, m antenna array elements of the AAU may be physically distinguished as x top antennas (first antenna 1221) and y bottom antennas (second antenna 1222). The top antennas are inclined upwardly and form an angle of 45 degrees with an antenna panel of the AAU. The bottom antennas are perpendicular to the antenna panel of the AAU. The arrangement of the top antennas to be inclined upwardly can ensure the coverage of the area directly above the base station 120. Similarly, in a scenario where the antenna module 122 includes a first and a second AAUs, the AAUs may be arranged to form an angle of 45 degrees, to ensure the coverage of the area directly above the base station 120.

It can be understood by those having ordinary skills in the art that the system architecture platform may be applied to 3rd Generation (3G) cellular communication, such as, Code Division Multiple Access (CDMA), Evolution-Data Optimized (EV-DO), Global System for Mobile Communications (GSM)/General Packet Radio Service (GPRS); or Fourth Generation (4G) cellular communication, such as LTE; or 5G cellular communication; or future evolved mobile communication network systems, which is not particularly limited in the embodiments of the present disclosure.

Those having ordinary skills in the art may understand that the system architecture platform shown in FIG. 1 does not constitute a limitation to the embodiments of the present disclosure, and more or fewer components than those shown in the figure may be included, or some components may be combined, or a different component arrangement may be used.

Based on the above-mentioned system architecture platform, various embodiments of the antenna selection method of the present disclosure are proposed.

Figure 2:
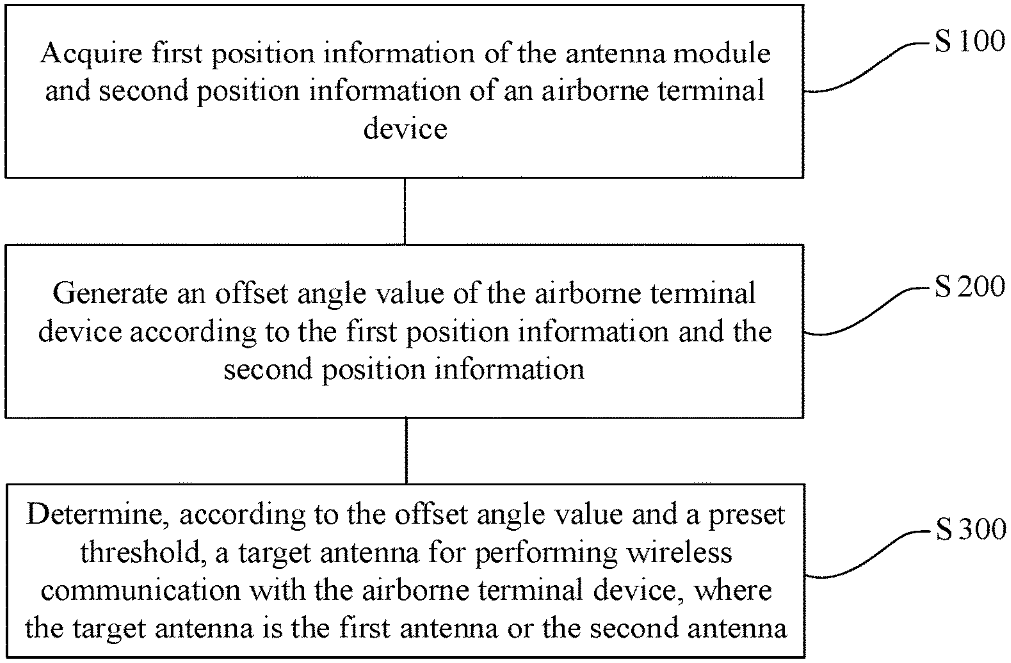
FIG. 2 is a flowchart of an antenna selection method according to an embodiment of the present disclosure.

FIG. 2 is a flowchart of an antenna selection method according to an embodiment of the present disclosure. The antenna selection method is applied to a BBU in the system architecture platform to select and control an antenna in the antenna module. The antenna selection method includes, but not limited to, the following steps S100, S200, and S300.

At S100, first position information of the antenna module and second position information of an airborne terminal device are acquired.

At S200, an offset angle value of the airborne terminal device is generated according to the first position information and the second position information.

At S300, a target antenna for performing wireless communication with the airborne terminal device is determined according to the offset angle value and a preset threshold, where the target antenna is the first antenna or the second antenna.

In an embodiment, the BBU acquires first position information reported by a base station corresponding to the antenna module and second position information of an airborne terminal device; then calculates an offset angle value of the airborne terminal device relative to the base station corresponding to the antenna module according to the first position information and the second position information; and determines, according to the offset angle value and a preset threshold, a target antenna for performing wireless communication with the airborne terminal device, where the target antenna is a first antenna or a second antenna. The target antenna is determined according to the offset angle value of the airborne terminal device relative to the antenna module, to continuously provide a high-quality wireless communication service for users, thereby meeting the needs of users on an aircraft.

It can be understood that the preset threshold is a threshold determined in advance according to the coverage ranges of the first antenna and the second antenna, and is set according to coverage capabilities of the first antenna and the second antenna, which is not particularly limited in the embodiments of the present disclosure.

In an embodiment, when the offset angle value is greater than the preset threshold, i.e., the aircraft on which the airborne terminal device is arranged is located in an area above the base station corresponding to the antenna module, the BBU determines the first antenna as the target antenna, and controls the first antenna in the antenna module to connect to the airborne terminal device in the aircraft, such that the airborne terminal device can connect to the first antenna which has a better coverage capability, thereby providing a high-quality wireless communication service for users on the aircraft. When the offset angle value is less than or equal to the preset threshold, i.e., the aircraft on which the airborne terminal device is arranged moves to an area obliquely above the base station corresponding to the antenna module, the BBU switches the target antenna from the first antenna to the second antenna, i.e., controls the second antenna in the antenna module to connect to the airborne terminal device, to continuously provide a high-quality wireless communication service for users, thereby meeting the needs of users on the aircraft.

Figure 3:
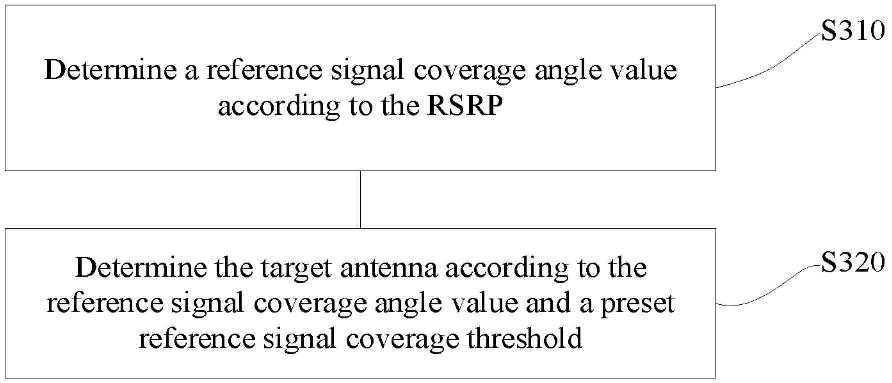
FIG. 3 is a flowchart of determining a target antenna when position information cannot be acquired in an antenna selection method according to an embodiment of the present disclosure.

Referring to FIG. 3, in an embodiment, in case of a failure in acquiring the first position information and/or the second position information and reception of an RSRP from the airborne terminal device, the antenna selection method further includes, but not limited to, the following steps S310 and S320.

At S310, a reference signal coverage angle value is determined according to the RSRP.

At S320, the target antenna is determined according to the reference signal coverage angle value and a preset reference signal coverage threshold.

In an embodiment, when the position information reported by the base station and the airborne terminal device is invalid or no position information is reported by the base station and the airborne terminal device, and an RSRP reported by the airborne terminal device is valid, a reference signal-based antenna selection policy is used. The reference signal coverage angle value is defined as y. The reference signal coverage threshold for reference signals of the first antenna and the second antenna is defined as &. The BBU selects, according to the reference signal coverage angle value y and the reference signal coverage threshold &, the target antenna to be connected to the airborne terminal device.

In an embodiment, when γ>ε, i.e., the aircraft on which the airborne terminal device is arranged is located in an area above the base station corresponding to the antenna module, the BBU determines the first antenna as the target antenna, and controls the first antenna in the antenna module to connect to the airborne terminal device in the aircraft, such that the airborne terminal device can connect to the first antenna which has a better coverage capability, thereby providing a high-quality wireless communication service for users on the aircraft. When γ<=ε, i.e., the aircraft on which the airborne terminal device is arranged moves to an area obliquely above the base station corresponding to the antenna module, the BBU switches the target antenna from the first antenna to the second antenna, i.e., controls the second antenna in the antenna module to connect to the airborne terminal device, to continuously provide a high-quality wireless communication service for users, thereby meeting the needs of users on the aircraft.

Figure 4:
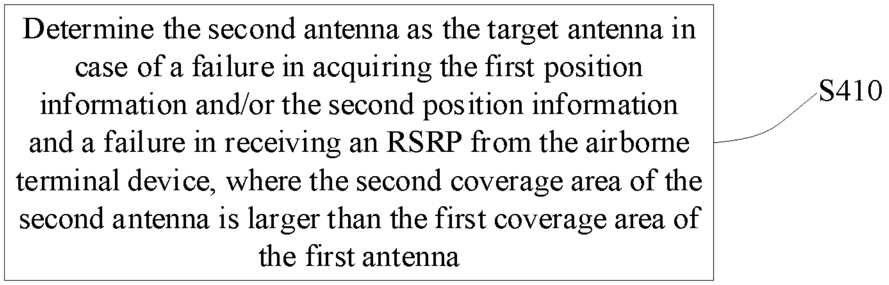
FIG. 4 is a flowchart of determining a target antenna when a Reference Signal Received Power (RSRP) from the airborne terminal device is not received in an antenna selection method according to an embodiment of the present disclosure.

Referring to FIG. 4, in an embodiment, the antenna selection method further includes, but not limited to, a following step S410.

At S410, the second antenna is determined as the target antenna in case of a failure in acquiring the first position information and/or the second position information and a failure in receiving an RSRP from the airborne terminal device, where the second coverage area of the second antenna is larger than the first coverage area of the first antenna.

In an embodiment, when the position information reported by the base station and the airborne terminal device is invalid or no position information is reported by the base station and the airborne terminal device, and an RSRP reported by the airborne terminal device is invalid or no RSRP is reported by the airborne terminal device, the BBU may determine a default antenna as the target antenna. For example, the coverage range of the second antenna is a horizontal range from the base station toward the flight path, which may be an area in a normal direction of the antenna panel of the antenna module of the base station, and the coverage range of the first antenna is an area above the base station, which may be an area above the antenna module corresponding to the base station. In this case, the coverage range of the second antenna is wider than that of the first antenna, and the second antenna with the wider coverage range may be set as the default antenna.

The antenna selection method will be described below by way of specific embodiments.

Figure 5:
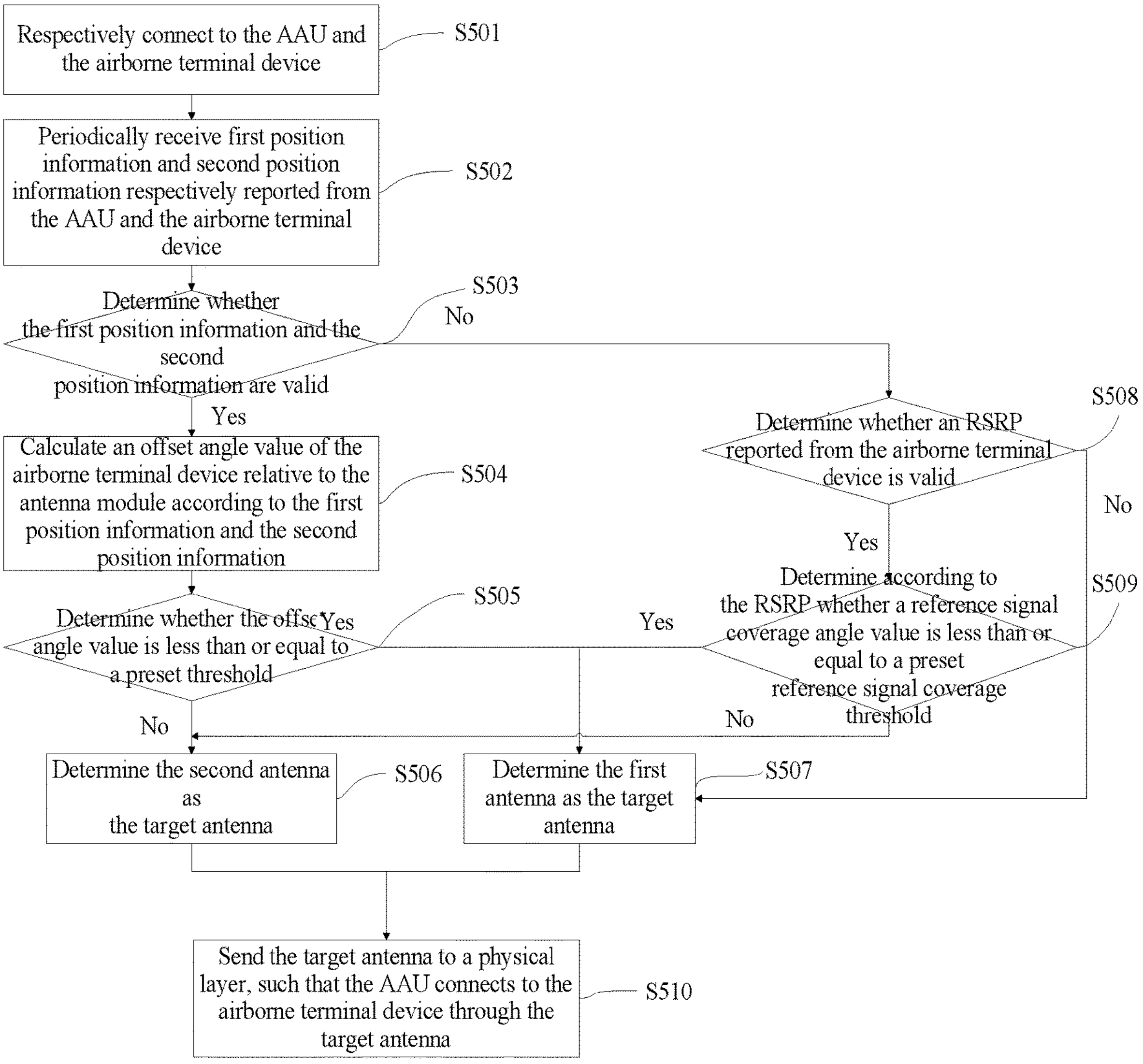
FIG. 5 is a flowchart of an antenna selection method according to another embodiment of the present disclosure.

Referring to FIG. 5, in an embodiment, the antenna selection method includes, but not limited to, the following steps S501 to S510.

At S501, the AAU and the airborne terminal device are respectively connected.

At S502, the first position information and second position information respectively reported from the AAU and the airborne terminal device are periodically received.

At S503, whether the first position information and the second position information are valid is determined; and if yes, S504 is executed, and if not, S505 is executed.

At S504, an offset angle value of the airborne terminal device relative to the antenna module is calculated according to the first position information and the second position information.

At S505, whether the offset angle value is less than or equal to a preset threshold is determined; and if yes, S506 is executed, and if not, S508 is executed.

At S506, the second antenna is determined as the target antenna (where the coverage range of the second antenna is the horizontal range from the base station toward the flight path).

At S507, the first antenna is determined as the target antenna (where the coverage area of the first antenna is an area above the base station).

At S508, whether an RSRP reported from the airborne terminal device is valid is determined; and if yes, S509 is executed, and if not, S510 is executed.

At S509, whether a reference signal coverage angle value is less than or equal to a preset reference signal coverage threshold is determined according to the RSRP; and if yes, S506 is executed; and if not, S507 is executed.

At S510, the target antenna is sent to a physical layer, such that the AAU is connected to the airborne terminal device through the target antenna.

In this embodiment, the target antenna for communication connection with the airborne terminal device is determined according to the offset angle value of the airborne terminal device relative to the antenna module, to continuously provide a high-quality wireless communication service for users, thereby meeting the needs of users on an aircraft.

Based on the above antenna selection method, various embodiments of an antenna selection apparatus, a BBU, a base station, and a computer-readable storage medium of the present disclosure are provided below respectively.

Figure 6:
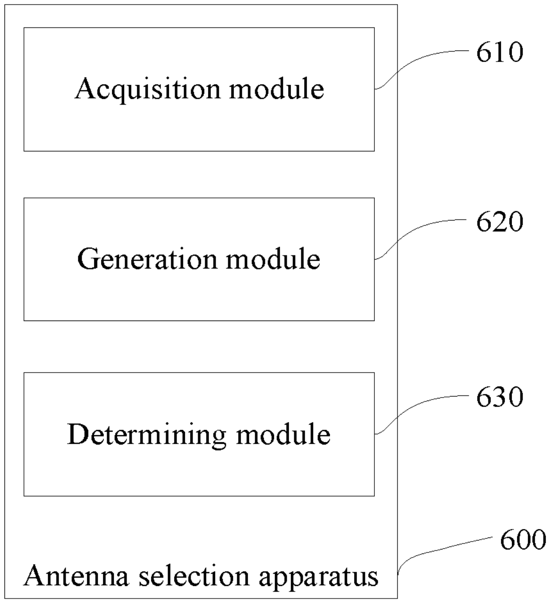
FIG. 6 is a schematic diagram of an antenna selection apparatus according to an embodiment of the present disclosure.

An embodiment of the present disclosure further provides an antenna selection apparatus 600. As shown in FIG. 6, the antenna selection apparatus 600 includes an acquisition module 610, a generation module 620, and a determining module 630. The acquisition module 610 is configured for acquiring first position information of an antenna module and second position information of an airborne terminal device. The generation module 620 is configured for generating an offset angle value of the airborne terminal device according to the first position information and the second position information. The determining module 630 is configured for determining, according to the offset angle value and a preset threshold, a target antenna for performing wireless communication with the airborne terminal device, where the target antenna is the first antenna or the second antenna.

The determining module 630 is further configured for determining the first antenna as the target antenna when the offset angle value is greater than the preset threshold; or determining the second antenna as the target antenna when the offset angle value is less than or equal to the preset threshold.

The determining module 630 is further configured for: in case of a failure in acquiring the first position information and/or the second position information and reception of an RSRP from the airborne terminal device, determining a reference signal coverage angle value according to the RSRP; and determining the target antenna according to the reference signal coverage angle value and a preset reference signal coverage threshold.

The determining module 630 is further configured for determining the first antenna as the target antenna when the reference signal coverage angle value is greater than the reference signal coverage threshold; or determining the second antenna as the target antenna when the reference signal coverage angle value is less than or equal to the reference signal coverage threshold.

The determining module 630 is further configured for determining the second antenna as the target antenna in case of a failure in acquiring the first position information and/or the second position information and a failure in receiving an RSRP from the airborne terminal device, where the second coverage area of the second antenna is larger than the first coverage area of the first antenna.

The antenna selection apparatus 600 has the same inventive idea as that of the antenna selection method in the above embodiment, uses the same technical means as that of the antenna selection method, solves the same problem as the antenna selection method, and can achieve the same technical effect as achieved by the antenna selection method, so the details will not be repeated herein.

Figure 7:
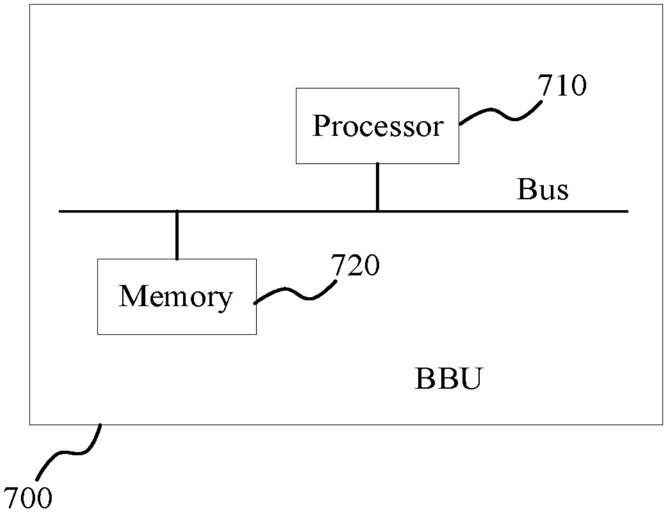
FIG. 7 is a schematic diagram of a BBU configured for executing an antenna selection method according to an embodiment of the present disclosure.

An embodiment of the present disclosure further provides a BBU. As shown in FIG. 7, the BBU 700 includes a memory 720, a processor 710, and a computer program stored in the memory 720 and executable by the processor 710.

The processor 710 and the memory 720 may be connected by a bus or in other ways.

The memory 720, as a non-transitory computer-readable storage medium, may be configured for storing a non-transitory software program and a non-transitory computer-executable program. In addition, the memory 720 may include a high-speed random access memory, and may also include a non-transitory memory, e.g., at least one magnetic disk storage device, flash memory device, or other non-transitory solid-state storage device. In some implementations, the memory 720 may include memories located remotely from the processor, and the remote memories may be connected to the processor via a network. Examples of the network include, but not limited to, the Internet, an intranet, a local area network, a mobile communication network, and combinations thereof.

The non-transitory software program and instructions required to implement the antenna selection method of the foregoing embodiments are stored in the memory 720 which, when executed by the processor 710, cause the processor 710 to implement the antenna selection method of the foregoing embodiments, for example, execute the method steps S100 to S300 in FIG. 2, the method steps S310 to S320 in FIG. 3, the method step S410 in FIG. 4, or the method steps S501 to S510 in FIG. 5.

An embodiment of the present disclosure further provides a base station, including the BBU in the above embodiment. The technical means used, the technical problem solved, and the effects achieved by the base station are the same as those of the base station in the above embodiment, so the details will not be repeated herein.

In addition, an embodiment of the present disclosure provides a non-transitory computer-readable storage medium, storing a computer-executable instruction which, when executed by a processor or controller, for example, by a processor in a communication device in the embodiment described above, may cause the processor to implement the antenna selection method applied to a BBU in the foregoing embodiments, for example, implement the method steps S100 to S300 in FIG. 2, the method steps S310 to S320 in FIG. 3, the method step S410 in FIG. 4, or the method steps S501 to S510 in FIG. 5.

In an embodiment of the present disclosure, a BBU configured for executing an antenna selection method is connected to an antenna module, the antenna module is configured for providing wireless communication coverage for a flight path, the antenna module includes a first antenna and a second antenna, a first coverage range of the first antenna is different from a second coverage range of the second antenna, and the method includes: acquiring, by the BBU, first position information of the antenna module and second position information of an airborne terminal device; generating an offset angle value of the airborne terminal device according to the first position information and the second position information; and determining, according to the offset angle value and a preset threshold, a target antenna for performing wireless communication with the airborne terminal device, where the target antenna is a first antenna or a second antenna. The target antenna is determined according to the offset angle value of the airborne terminal device relative to the antenna module, to continuously provide a high-quality wireless communication service for users, thereby meeting the needs of users on an aircraft.

Those having ordinary skills in the art can understand that all or some of the steps in the methods disclosed above and the functional modules/units in the system and the apparatus can be implemented as software, firmware, hardware, and appropriate combinations thereof. Some or all physical components may be implemented as software executed by a processor, such as a central processing unit, a digital signal processor, or a microprocessor, or as hardware, or as an integrated circuit, such as an application-specific integrated circuit. Such software may be distributed on a computer-readable medium, which may include a computer storage medium (or non-transitory medium) and a communication medium (or transitory medium). As is known to those having ordinary skills in the art, the term "computer storage medium" includes volatile and nonvolatile, removable and non-removable media implemented in any method or technology for storage of information (such as computer-readable instructions, data structures, program modules, or other data). The computer storage medium includes, but not limited to, a Random Access Memory (RAM), a Read-Only Memory (ROM), an Electrically Erasable Programmable Read-Only Memory (EEPROM), a flash memory or other memory technology, a Compact Disc Read-Only Memory (CD-ROM), a Digital Versatile Disc (DVD) or other optical storage, a cassette, a magnetic tape, a magnetic disk storage or other magnetic storage device, or any other medium which can be used to store the desired information and can be accessed by a computer. In addition, as is known to those having ordinary skills in the art, the communication medium typically includes computer-readable instructions, data structures, program modules, or other data in a modulated data signal such as a carrier or other transport mechanism, and can include any information delivery medium.

Although some embodiments of the present disclosure have been described above, the present disclosure is not limited to the implementations described above. Those having ordinary skills in the art can make various equivalent modifications or replacements without departing from the essence of the present disclosure. Such equivalent modifications or replacements fall within the scope defined by the claims of the present disclosure.

What is claimed is:

1. An antenna selection method, applied to a base band unit (BBU), wherein, the BBU is connected to an antenna module which is configured for providing wireless communication coverage for a flight path and comprises a first antenna having a first coverage range and a second antenna having a second coverage range, and the first coverage range is different from the second coverage range, the method comprising:

acquiring first position information of the antenna module and second position information of an airborne terminal device;

generating an offset angle value of the airborne terminal device according to the first position information and the second position information; and determining, according to the offset angle value and a preset threshold, a target antenna for performing wireless communication with the airborne terminal device, wherein the target antenna is the first antenna or the second antenna;

in response to a failure in acquiring the first position information and/or the second position information and reception of a Reference Signal Received Power (RSRP) from the airborne terminal device, determining a reference signal coverage angle value according to the RSRP; and determining the target antenna according to the reference signal coverage angle value and a preset reference signal coverage threshold.

2. The antenna selection method of claim 1, wherein the first coverage range at least partially overlaps with the second coverage range.

3. The antenna selection method of claim 1, wherein determining, according to the offset angle value and a preset threshold, a target antenna for performing wireless communication with the airborne terminal device comprises:

determining the first antenna as the target antenna in response to the offset angle value being greater than the preset threshold; or determining the second antenna as the target antenna in response to the offset angle value being less than or equal to the preset threshold.

4. The antenna selection method of claim 1, wherein determining the target antenna according to the reference signal coverage angle value and a preset reference signal coverage threshold comprises:

determining the first antenna as the target antenna in response to the reference signal coverage angle value being greater than the reference signal coverage threshold; or determining the second antenna as the target antenna in response to the reference signal coverage angle value being less than or equal to the reference signal coverage threshold.

5. The antenna selection method of claim 1, further comprising:

determining the second antenna as the target antenna in response to a failure in acquiring the first position information and/or the second position information and a failure in receiving an RSRP from the airborne terminal device, wherein the second coverage area of the second antenna is larger than the first coverage area of the first antenna.

6. The antenna selection method of claim 1, wherein the first antenna is configured for covering an area above the antenna module, and the second antenna is configured for covering a horizontal range from the antenna module toward the flight path.

7. The antenna selection method of claim 6, wherein:

in response to the antenna module comprising one active antenna processing unit, the first antenna comprises a first antenna array, and the second antenna comprises a second antenna array; or in response to the antenna module comprising two active antenna processing units, the first antenna is one of the active antenna processing units, and the second antenna is the other active antenna processing unit.

8. An antenna selection apparatus, comprising:

an acquisition module, configured for acquiring first position information of an antenna module and second position information of an airborne terminal device;

a generation module, configured for generating an offset angle value of the airborne terminal device according to the first position information and the second position information; and a determining module, configured for determining, according to the offset angle value and a preset threshold, a target antenna for performing wireless communication with the airborne terminal device, wherein the target antenna is the first antenna or the second antenna;

wherein the determining module is further configured for:

in response to a failure in acquiring the first position information and/or the second position information and reception of a Reference Signal Received Power (RSRP) from the airborne terminal device, determining a reference signal coverage angle value according to the RSRP; and determining the target antenna according to the reference signal coverage angle value and a preset reference signal coverage threshold.

9. A base band unit (BBU), comprising a memory, a processor, and a computer program stored in the memory and executable by the processor, wherein the computer program, when executed by the processor, causes the processor to perform the antenna selection method of claim 1.

10. A base station, comprising the base band unit (BBU) of claim 9.

11. A non-transitory computer-readable storage medium, storing a computer-executable instruction which, when executed by a processor, causes the processor to perform the antenna selection method of claim 1.

* * * * *